United States Patent
Peng et al.

(10) Patent No.: US 10,719,431 B2
(45) Date of Patent: Jul. 21, 2020

(54) GRAPH BASED CODE PERFORMANCE ANALYSIS

(71) Applicant: SAP SE, Walldorf (DE)

(72) Inventors: Yang Peng, Shanghai (CN); Yueling Wang, Shanghai (CN); Jieying Zhang, Shanghai (CN); Yunfeng Jiang, Shanghai (CN); Junshan Xu, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/223,414

(22) Filed: Dec. 18, 2018

(65) Prior Publication Data

US 2020/0192789 A1 Jun. 18, 2020

(51) Int. Cl.
*G06F 11/36* (2006.01)
*G06F 16/904* (2019.01)
*G06F 9/445* (2018.01)
*G06F 8/77* (2018.01)

(52) U.S. Cl.
CPC ............ *G06F 11/3688* (2013.01); *G06F 8/77* (2013.01); *G06F 9/44589* (2013.01); *G06F 16/904* (2019.01)

(58) Field of Classification Search
CPC ............. G06F 11/3466; G06F 11/3612; G06F 11/3624; G06F 11/3644; G06F 11/3636; G06F 2201/865; G06F 8/443; G06F 11/362; G06F 11/3676
See application file for complete search history.

(56) References Cited

U.S. PATENT DOCUMENTS

| | | | |
|---|---|---|---|
| 8,584,100 B2 | 11/2013 | Xu et al. | |
| 2004/0148594 A1* | 7/2004 | Williams | G06F 9/4484 717/158 |
| 2004/0230763 A1* | 11/2004 | Cohen | G06F 11/3466 711/170 |
| 2008/0092121 A1* | 4/2008 | DeRose | G06F 11/3409 717/125 |
| 2010/0275185 A1* | 10/2010 | Burton | G06F 11/3644 717/130 |
| 2011/0145788 A1* | 6/2011 | Xu | G06F 11/368 717/121 |
| 2012/0084178 A1 | 4/2012 | Ehbauer et al. | |

(Continued)

*Primary Examiner* — S. Sough
*Assistant Examiner* — Cheneca Smith
(74) *Attorney, Agent, or Firm* — Fish & Richardson P.C.

(57) ABSTRACT

Techniques are described for graph based code performance analysis of software, such as software that is being developed and tested in a development environment. Implementations provide a technique for instrumenting code by adding various annotations into the code. Each annotation may be a function call that executes with the annotated code, but does not alter the behavior and/or functionality of the annotated code apart from outputting call tracking information during execution. The call tracking information generated by annotations can be analyzed to generate a call graph that depicts calling relationships between functions in the code. The call graph can be presented within a user interface and/or automatically analyzed to develop recommendations regarding code coverage for testing, impact information describing how changes to one function impact another function, code optimization recommendations, and so forth.

11 Claims, 4 Drawing Sheets

(56) References Cited

U.S. PATENT DOCUMENTS

| | | | |
|---|---|---|---|
| 2016/0188304 A1* | 6/2016 | Abadi | G06F 9/45529 717/157 |
| 2018/0046562 A1 | 2/2018 | Yu et al. | |
| 2018/0300224 A1 | 10/2018 | Peng et al. | |
| 2019/0065346 A1* | 2/2019 | Krauss | G06F 11/3612 |

* cited by examiner

GRAPH BASED CODE PERFORMANCE ANALYSIS

BACKGROUND

Software development organizations engage in various practices to ensure that the software produced is of sufficiently high quality, according to whatever standards or benchmarks are relevant in various scenarios. In many instances, an organization may test the generated software in various way to measure its quality. When attempting to develop or enhance software solution by making changes to its code, such as to fix bugs, add features, modify features, or for other purposes, developers may inadvertently introduce errors and/or inefficiencies into the code base, which may break the desired functionality, decrease performance, and/or cause other types of problems. A software development organization may be interested in finding such issues, preferably early in the development process, and identify the origin of the issues. However, identifying problems and determining their origin with sufficient precision can be a challenge.

SUMMARY

Implementations of the present disclosure are generally directed to software testing. More specifically, implementations are directed to techniques for software testing of (e.g., front end) code by automatically instrumenting the code to include annotations, collecting information that is generated by the presence of the annotations when the code is executed, and developing a call map that describes calling dependences among functions in the code, and using the call map to ensure adequate code coverage during testing, characterizing the impact of code changes on dependencies, and/or other operations.

In general, innovative aspects of the subject matter described in this specification can be embodied in methods that include operations of: instrumenting code to add annotations to each of a plurality of functions in the code, wherein the annotations are added to functions that are described in at least two different source code files; executing the code including the annotations to generate information that at least indicates, for each of the functions, an entry into a respective function that is indicated by execution of a respective annotation included in the respective function; analyzing the information to generate a call graph that indicates dependencies among the functions in the code; and providing the call graph for presentation in a user interface (UI) executing on a computing device.

Implementations can optionally include one or more of the following features: the code is front end code; the operations further include analyzing the call graph to determine at least one dependency between the at least two different source code files that is indicated by at least one dependency between functions in the at least two different source code files; the operations further include analyzing the call graph to generate a resource optimization recommendation regarding a rearrangement of the functions among the at least two different source code files; the operations further include analyzing the call graph to generate impact analysis information that describes, for a change to one of the functions, a minimal path that includes other functions that exhibit a dependency on the changed function; the annotations include a respective annotation that is added to a first line of the respective function to indicate the entry into the respective function; the annotations include a store annotation and a retrieve annotation that are added before and after each other function that is called inside the respective function; the store annotation is arranged to store a current call stack before execution of the respective other function; and/or the retrieve annotation is arranged to retrieve the current call stack after execution of the respective other function.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure can be apparent from the description and drawings, and from the claims.

DETAILED DESCRIPTION

Figure 1:
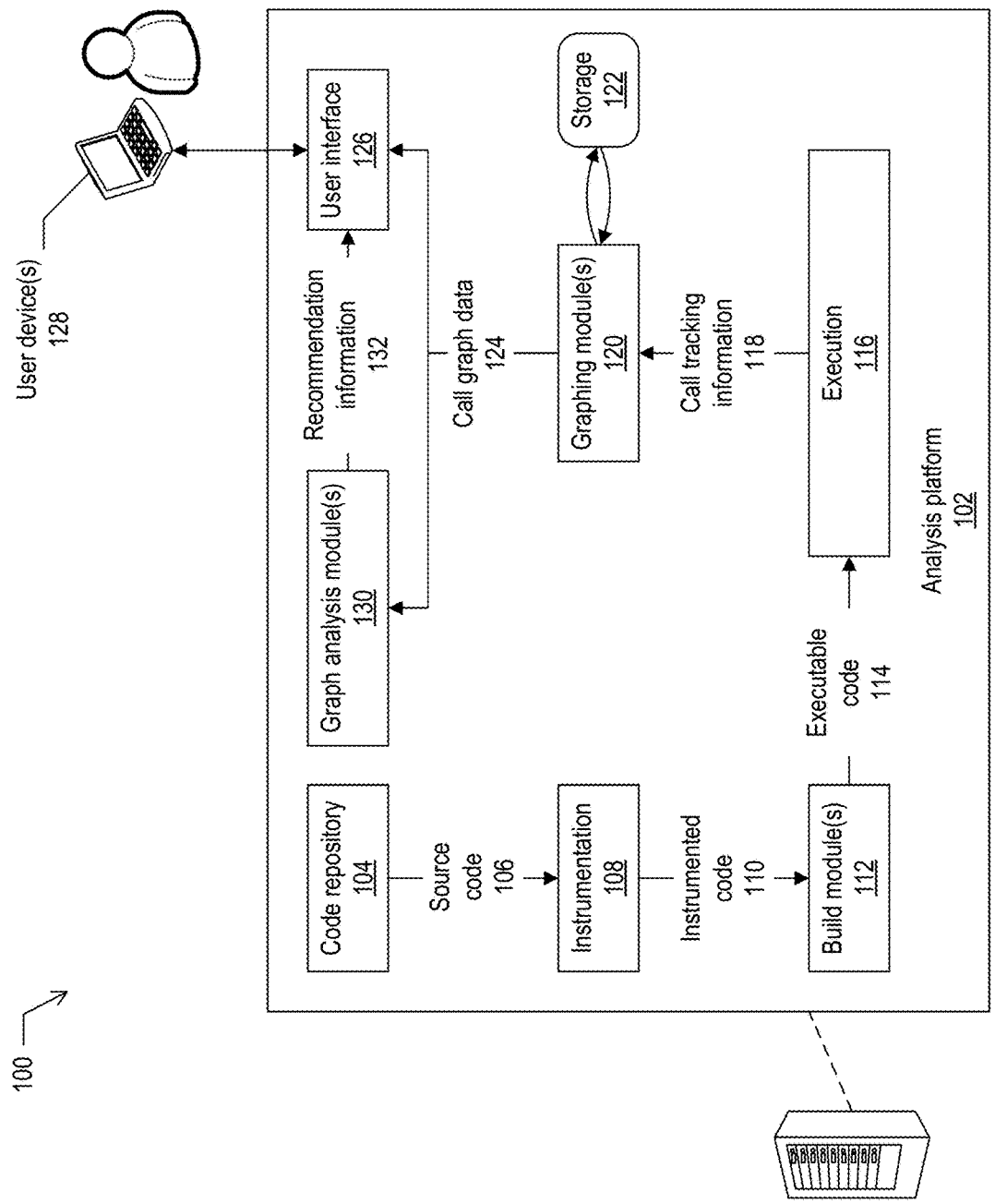
FIG. 1 depicts an example system for graph based code performance analysis, according to implementations of the present disclosure.

Implementations of the present disclosure are directed to systems, devices, methods, and computer-readable media for graph based code performance analysis in software, such as software that is being developed and tested in a development environment. Implementations provide a technique (e.g., framework) for instrumenting code by adding various annotations into the code. The annotated code may be source code, such as JavaScript™ code that implements a front end of a software system. Each annotation may be a function call that executes with the annotated code, but does not alter the behavior and/or functionality of the annotated code apart from outputting call tracking information during execution. For example, an annotation may be an entry point tracking function that is added at (or close to) the start of a function, to output call tracking information that indicates an entry into the function. As another example, annotations may be call stack store and call stack retrieve functions that are added before and after, respectively, a function that is called within another function, and that operate to store and retrieve, respectively, a current call stack before and after the other function. Other annotations may also be employed, as described further below.

The annotations may generate call tracking information during execution of the code, and the call tracking information can be analyzed to generate a call graph. The call graph can graphically indicate calling relationships between functions in the code. The calling relationships are also referred to herein as dependencies. A dependency between two functions indicates that one function is called from within another function. In some examples, the source code being annotated is included in multiple, different source code files (e.g., *.js files for JavaScript™ code). The implementations described herein therefore enable the tracking of dependencies between different source code files.

The call graph can be presented within a user interface (UI), to help a user (e.g., developer) understand dependencies within the code. The call graph can also be analyzed to develop recommendations regarding code coverage for testing, impact information describing how changes to one function impact another function, code optimization recommendations, and so forth.

Also examples herein describe the annotation of JavaScript™ code, implementations can also be applied to code that is written in any suitable programming language. As used herein, a function describes a portion of code that can be called with zero or more parameters, performs one or more operations, and returns to the calling code with or without a return value. A function can also be described as a method, a routine, a subroutine, a code block, and so forth.

In some implementations, the code being tested is front end code that provides an interface and/or user experience for an application of any type. For example, the application may be a web application, and the front end code may be at least partly implemented using JavaScript™. When debugging JavaScript™ code using previously available tools, traditional line number coverage information may not provide developers with useful information given that JavaScript™ is lightweight, wick-typed, and module-based. Moreover, if the JavaScript™ has been optimized, compressed, and/or grouped as part of a static resource management process, the line number information may not convey any useful information. Implementations described herein provide a mechanism for impact analysis of a front end code change, by determining dependencies between methods and/or different source code files, and by managing dependencies more accurately for improved optimization. Using the implementations described herein can lead to a significant reduction in development costs, by finding problems in the code earlier and clearly identifying the source of the problem (e.g., a particular code check-in or change).

FIG. 1 depicts an example system 100 for graph based analysis, according to implementations of the present disclosure. As shown in this example, an analysis platform 102 is hosted on or otherwise provided by one or more computing devices of any suitable number and type. The analysis platform 102 (also described as the platform), can include a code repository 104 of any suitable type. Alternatively, the code repository 104 may be separate from the platform, and the platform may communicate with the code repository 104 over one or more networks. The code repository 104 can store any appropriate number and type of source code 106 modules. The source code 106 can be written in any suitable programming language(s). The code repository 104 can also operate as a version control system, tracking different versions of checked in code, enabling the specifying of different code trees or branches for different releases, and so forth.

The platform can include one or more instrumentation modules 108 that automatically instrument the source code 106 as described herein to generate instrumented code 110. In examples where the source code 106 is compiled prior to execution, the platform can also include one or more build module(s) 112 that generate executable code 114 (e.g., binary, executable code with machine-executable instructions) based on the instrumented source code 110. The build module(s) 112 can include tools that are used to generate executable code from source code modules and/or other information, such as compilers, linkers, build software, metadata interpreters, and so forth.

The instrumented executable code 114 can be received by execution module(s) 116 on the platform. The module(s) 116 execute the instrumented executable code 114 (e.g., in a test environment), or the executable code 114 can be executed otherwise. Call tracking information 118 can be output by the annotations during execution of the code. The call tracking information 118 can indicate an order in which functions in the code are called, with a function identifier associated with a timestamp (e.g., indicating date and time) in some implementations.

The call tracking information 118 can be provided to graphing module(s) 120 that execute on the platform to analyze the call tracking information 118 and generate call graph data 124 including one or more call graphs. A call graph can indicate dependencies between functions in the source code, as described above. The platform can include data storage 122 of any suitable amount and type, which can be used to store the call graph data 124, the call tracking information 118, the recommendation information 132, and/or other information associated with the analysis.

In some implementations, the platform provides a UI 126 that presents the call graph data 124. A user can employ a user device 128, of any suitable type of computing device, to access the UI 126 and view the call graph data 124. The platform can also execute graph analysis module(s) 130 that analyze the call graph data 124 and generate recommendation information 132 based on the analysis. The UI 126 can present information in any suitable format, include tabular results information, graphs showing trends or changes from version to version in the code base, the call graph(s) themselves, and so forth.

In some implementations, frameworks such as jUnit, cppUnit, Paxexam, Mockito, and so forth can be used to test the code, and the call tracking data 118 may be collected in parallel as the testing is performed, as part of the framework used for testing the code, such as functional testing, performance testing, usability testing, unit testing, regression testing, and so forth.

In some implementations, the framework and workflow described herein can be technically implemented and added to an existing build and test environment, such as with a testing trigger firing on a code push to the code repository (e.g., version control system) such as Gerrit, Github, Perforce, or other. Implementations can also integrate and/or interface with task-tracking and/or issue-tracking systems such as Jira, Bugzilla, Team Foundation Server, and so forth.

In some implementations, the code is instrumented automatically in response to a check in of the code. Instrumentation provides the ability to track the various function calls that are made to functions described in the various source code files (e.g., .js files). Table 1 below provides example output that may be included in the call tracking information.

TABLE 1

AUtil.js::Tool.a.b
BUtil.js::Dialog.render.$12

As shown in this example, each record in the call tracking information may list the file name (e.g., AUtil.js, BUtil.js), and a method name fully described with call depth (e.g., Tool.a.b, Dialog.render.$12). For example, AUtil.js and BUtil.js are the original JavaScript™ source files, the Tool.a.b is the function name, indicating an inner function (e.g., "a" inside of "Tool" scope, "b" inside of "a" scope). In instances where there is an anonymous function, the output can list a relative index. For example, Dialog.render.$12 indicates the 12th anonymous function inside of the Dialog.render scope.

For call depths tracking, implementations can use a global depth index, given that JavaScript™ is single-threaded, which can provide virtual stack frames that include all the current calling functions. Table 2 lists an example function with annotations added.

TABLE 2

```
function aa( ){
var _c = _c_e(methodName); // track the current call, and give
the current call depths: _c,
// before a call, store the call depth, and after the call, restore
the call depth
_c_s(_c); callSomeMethod( );_c_r(_c); }
```

In this example, __c is a depth variable that stores call stack depth. To view the current stack depth, a user may instruct the debugger to display the current value of that variable. _c_e is an annotation method call that is added to indicate that a function is being entered. This function returns the stack depth to variable __c. _c_s is an annotation method call that is added to the code to store the current stack depth to memory prior to an inner function call, and _c_r is an annotation function call that is added to the code to restore stored stack depth from memory. For each function called within another function, the instrumentation can bracket the call with _c_s and _c_r calls to store and restore the call stack respectively.

Using data storage, implementations can leverage memory hashmap and/or browser session storage to store the tracking data (e.g., call stack depth) and transfer it back to a server if needed. In some implementations, a hash can be generated for each function in each source code file, and used to determined whether a function has been changed in a particular code check in (e.g., if its hash has changed relative to the last version checked in).

Implementations can be described as providing logic wrapping, which provides the chance to reset context before any expressions using the bracketed calls to the store and restore annotation functions. In some instances, annotation employs OR expression wrapping equivalence. For example, for any expression (e.g., in JavaScript™, any expression can be treated as a value expression), the instrumentation can set it as [EXP], then [EXP]=CALL(X)||[EXP] (e.g., where || is an OR operator). This allows implementations to set the precondition for an expression that involves a function call. The CALL may return undefined. As a particular example, where the original code is:

var a=getHeight( )+20;

Given that the getHeight( ) function is to be monitored in this example, instrumentation adds a _c_s( ) call, using the OR wrapping, and the annotated code may be:

var a=(_c_s(__c)||(getHeight( )))+20;

When JavaScript™ evaluates the script, it can call _c_s( ) first, since it returns false as always, then evaluate getHeight( ) and the return value may be the final value, and plus 20. Thus, the whole expression has the same output, with no logic impact caused by the annotations.

In some instances, annotation employs a RETURN expression wrapping equivalence. For an expression, given that it is a value expression, [EXP] can be transformed to [EXP]=CALL(X, [EXP]), and CALL returns [EXP]. As a particular example, where the original code is:

return getHeight( );

Implementations ensure that _c_e( ) is the last call of the function, and the RETURN wrapping is the appropriate option, such that getHeight is called first, and _c_e is the last call. The annotated code is:

return _c_e(c,getHeight( ));

In this example, _c_e returns the second parameter, which is the return value of getHeight, so no logic breaking is caused by the instrumentation.

In some instances, annotation employs IF expression wrapping equivalence. For an expression, instrumentation can add a IF (true) to it, hence [EXP]=if(CALL(X))[EXP], where CALL returns true. This can solve the return statement issue, given that in some browser JavaScript™ engines, (return a) is treated as invalid syntax. As a particular example, where the original code is:

if(a) return getHeight( );

To wrap a function for the if switch (e.g., meaning that the if true condition is covered), instrumentation can use below statement:

if(a) if(_c_hit( ))return getHeight( );

In this way, the syntax is not impacted while logic is not impacted as well.

Tables 3 and 4 below provide a further example of instrumenting code. Table 3 shows an example of original code prior to instrumentation, and Table 4 shows an example of the corresponding instrumented code.

TABLE 3

```
InterstitialUtil.getHost = function(str) {
    // get host name from the given http url string based on the regex in
    //RFC2396 Appendix B (for example).
    var parser = /^(?:([^:/?#]+):)?(?:\/\/([^/?#]*))?([^?#]*)(?:\?([^#]*))?(?:#(.*))?/;
    var result = str.match(parser);
    return result[2];
}
```

TABLE 4

```
InterstitialUtil.getHost = function(str) { var _c = _c_e(_c_b1 + ".3");
    // get host name from the given http url string based on the regex in
    //RFC2396 Appendix B (for example).
_c_c(_c_b1, 27);
    var parser = /^(?:([^:\/?#]+):)?(?:\/\/([^:\/?#]*))?([^?#]*)(?:\?([^#]*))?(?:\#(.*))?/;
_c_c(_c_b1, 28);
    var result = _c_s(_c_r(_c)) || (str.match(parser)), _c);
    if (_c_c(_c_b1, 29)) return result[2];
}
```

During the code execution, the annotations output the call tracking information that indicates the call dependencies (e.g., with file name, depth, and method name), and provides the data for further analysis. For example, the data can be submitted to a reporting server, or kept in the client browser storage. A call graph can be generated based on the output data, and used for further analysis.

In some examples, the call graph can be analyzed to perform an impact analysis to gauge the impact on the code of a code change in a function. For example, the impact analysis can determine whether other functions (e.g., dependencies) would be impacted through a code change made to a particular function that the other functions depend on. Based on detect a change to a function, or any source code file change, parent scope function change, etc., the call graph can be analyzed to determine the minimal path through the graph that can be traversed to cover the functions that depend on the changed function. The graph can also be analyzed to determine those paths for different sub trees associated with (e.g., critical) user scenarios, and a minimal set of test scenarios can be determined that provide adequate test coverage for the minimal paths. In this way, implementations employ the call graph analysis to determine the minimal set of user scenarios to cover full paths of that can reflect the change in the code, in a way that is both accurate and fast.

The call graph analysis can also be performed for dependencies discovery. The call graph associates source code files with functions. By looking up the file layer of the graph, a dependency graph can be generated.

The call graph analysis can also be performed for resource optimization based on dependencies. Using the file dependency graph, recommendations can be generated indicating how best to optimize the page (e.g., *.js) files. For example, if there are multiple grouped source code files, the analysis can calculate the sequence of source code files and regroup them as needed. This may depend on a static resource loading strategy.

Figure 2:
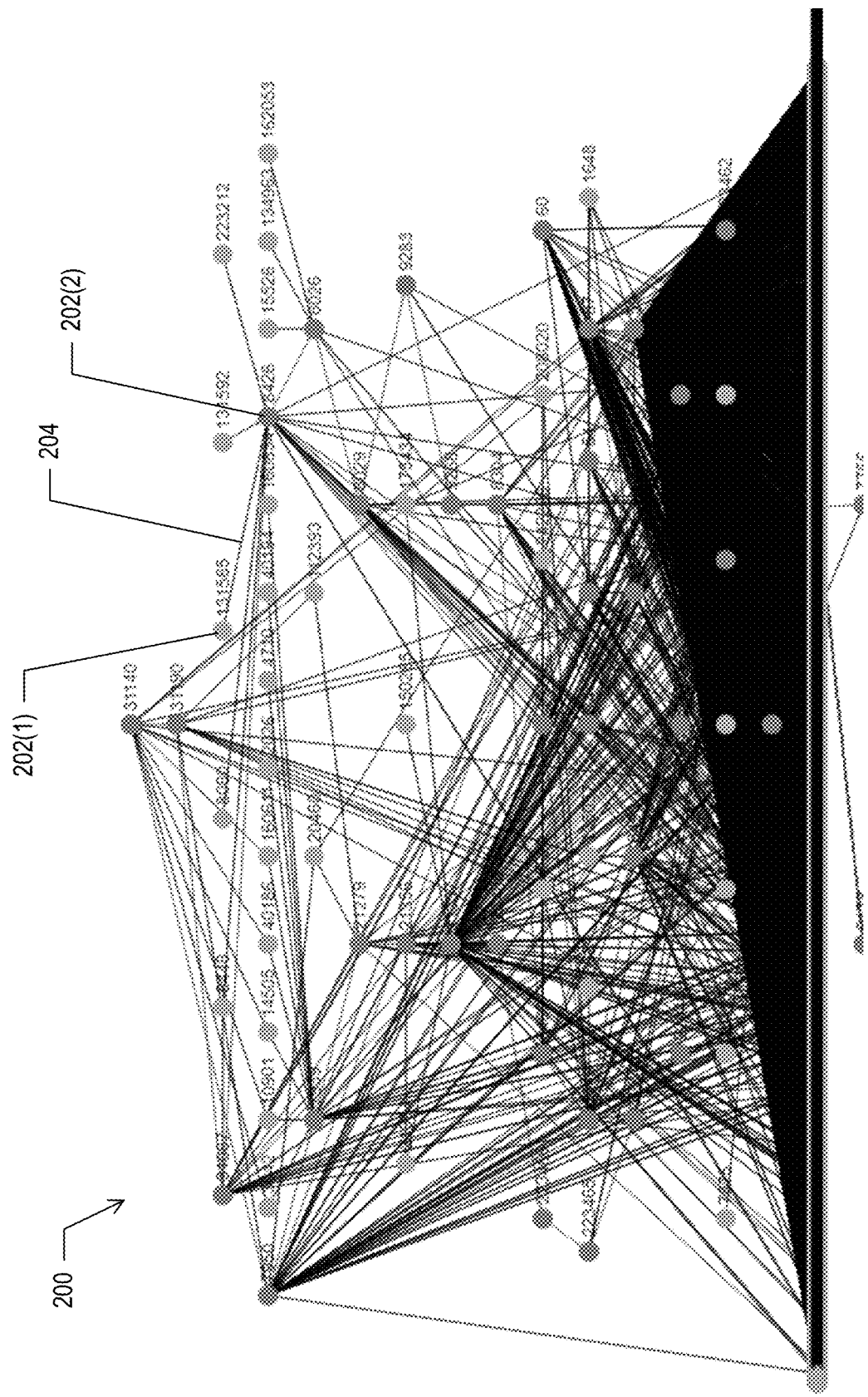
FIG. 2 depicts an example call graph, according to implementations of the present disclosure.

FIG. 2 depicts an example call graph 200, according to implementations of the present disclosure. As shown in this example, the graph can include any number of nodes 202 that each correspond to a function or a source code file (e.g., *.js file). An edge 204 between nodes 202 indicates a relationship between nodes, such as a dependency. A dependency between functions can indicate that one function is called by another function. A dependence between function and source code file can indicate that a function is described in the source code file. A dependency between source code files can indicate that a function described in the first file is called by a function described in the second file.

Figure 3:
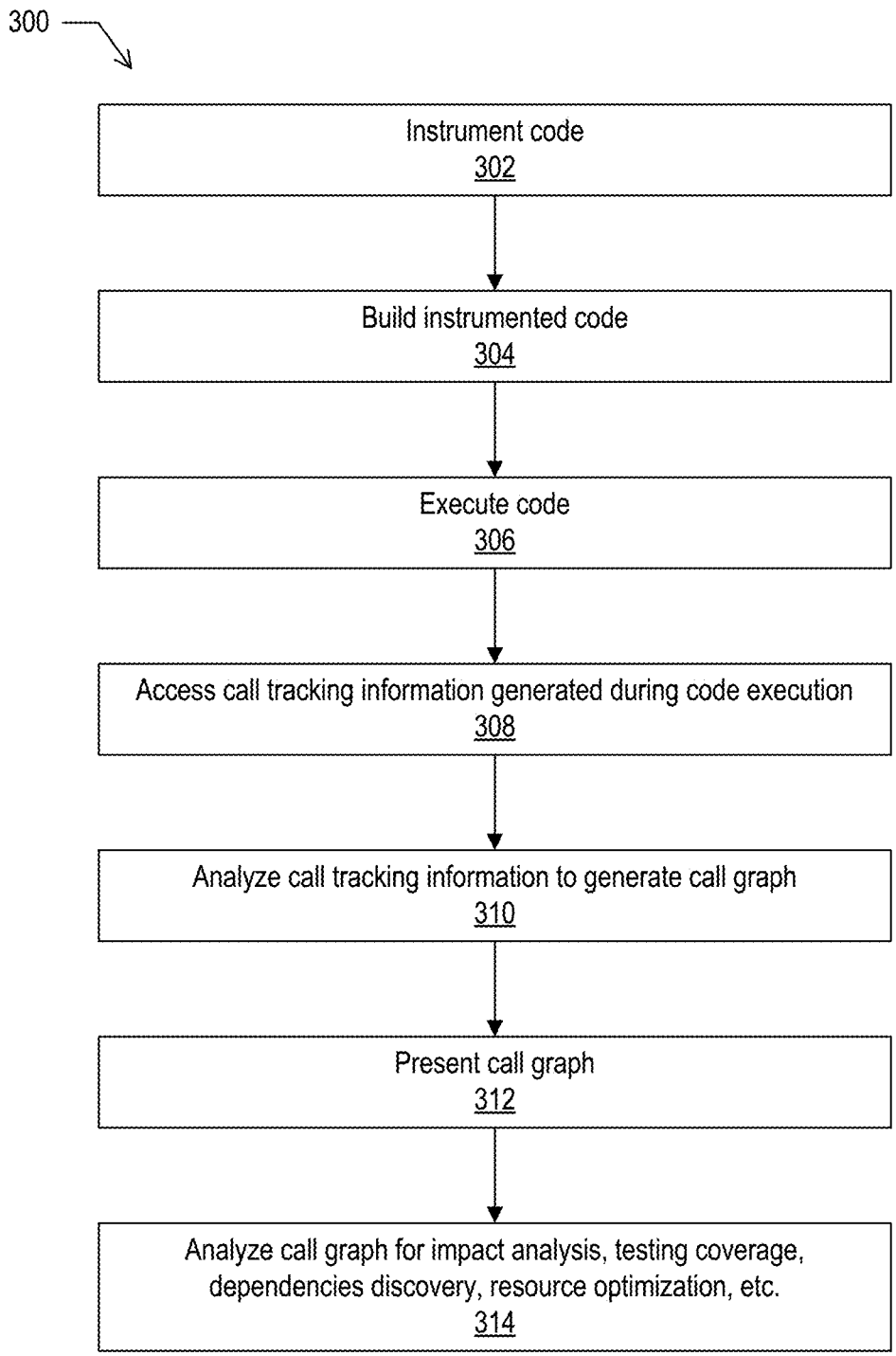
FIG. 3 depicts an example flow diagram of a process for graph based code performance analysis, according to implementations of the present disclosure.

FIG. 3 depicts an example flow diagram 300 of a process for graph based code performance analysis, according to implementations of the present disclosure. Operations of the process can be performed by one or more of the instrumentation module(s) 108, the build module(s) 112, the execution module(s) 116, the graphing module(s) 120, the graph analysis module(s) 130, the UI 126, and/or other software module(s) executing on the platform 102 or elsewhere.

The code is instrumented (302), built (304), and executed (306) as described above. The call tracking information generated during the execution can be accessed (308) and analyzed (310) to generate a call graph. The call graph can be presented (312) in the UI or stored for further access. The call graph can also be analyzed (314) for impact analysis, testing coverage analysis, dependencies discovery, resource optimization analysis, and/or other types of analyses.

Figure 4:
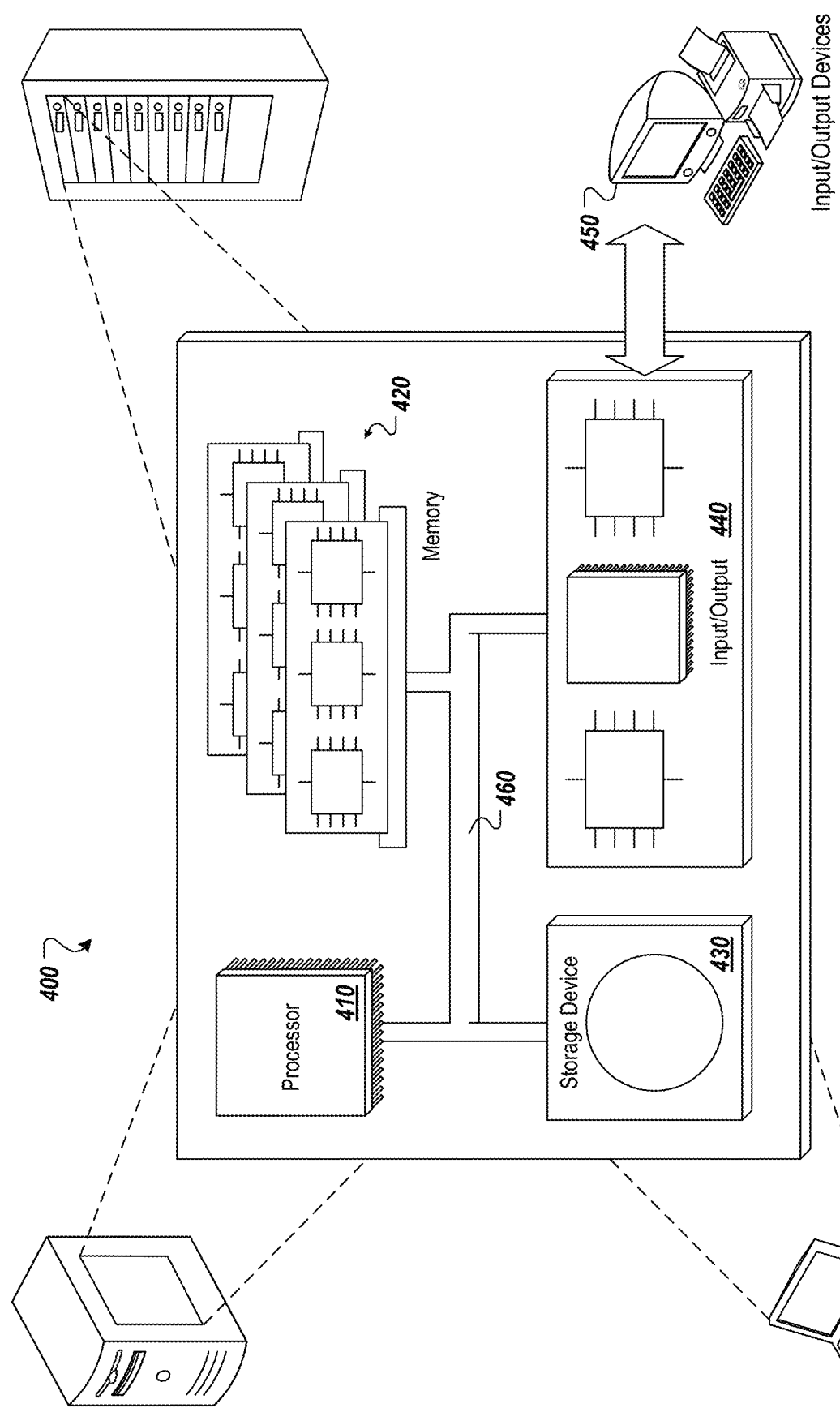
FIG. 4 depicts an example computing system, according to implementations of the present disclosure.

FIG. 4 depicts an example computing system, according to implementations of the present disclosure. The system 400 may be used for any of the operations described with respect to the various implementations discussed herein. For example, the system 400 may be included, at least in part, in computing device(s) that host or otherwise provide the analysis platform 102, the user device(s) 128, and/or other computing device(s) or system(s) described herein. The system 400 may include one or more processors 410, a memory 420, one or more storage devices 430, and one or more input/output (I/O) devices 450 controllable through one or more I/O interfaces 440. The various components 410, 420, 430, 440, or 450 may be interconnected through at least one system bus 460, which may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory, random access memory, or both. In some examples, the memory 420 may be employed as active or physical memory by one or more executing software modules.

The storage device(s) 430 may be configured to provide (e.g., persistent) mass storage for the system 400. In some implementations, the storage device(s) 430 may include one or more computer-readable media. For example, the storage device(s) 430 may include a floppy disk device, a hard disk device, an optical disk device, or a tape device. The storage device(s) 430 may include read-only memory, random access memory, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 400. In some implementations, the CRSM may include a data store that provides storage of computer-readable instructions or other information in a non-transitory format. The CRSM may be incorporated into the system 400 or may be external with respect to the system 400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 410 and the memory 420 may be supplemented by, or incorporated into, one or more application-specific integrated circuits (ASICs).

The system 400 may include one or more I/O devices 450. The I/O device(s) 450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 450 may also include one or more output devices such as a display, LED(s), an audio output device (e.g., a speaker), a printer, a haptic output device, and so forth. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 may comply with a version of the RS-232 standard for serial ports, or with a version of the IEEE 1284 standard for parallel ports. As another example, the I/O interface(s) 440 may be configured to provide a connection over Universal Serial Bus (USB) or Ethernet. In some examples, the I/O interface(s) 440 may be configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more networks using any network protocol.

Computing devices of the system 400 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it can be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   instrumenting, by the at least one processor, code to add annotations to each of a plurality of functions in the code, wherein the annotations are added to functions that are described in at least two different source code files containing different code, wherein the annotations include a store annotation added before and a retrieve annotation added after each of the plurality of functions in the code, wherein executing the store annotation stores a current call stack before execution of a respective function, and wherein executing the retrieve annotation retrieves the current call stack after execution of the respective function;

executing, by the at least one processor, the code including the annotations to generate information that at least indicates for each of the functions:
an entry into the respective function that is indicated by execution of a respective annotation included in the respective function;
the current call stack before execution of the respective function; and
the current call stack after execution of the respective function;
analyzing, by the at least one processor, the information to generate a call graph that indicates dependencies among the functions in the code;
providing, by the at least one processor, the call graph for presentation in a user interface (UI) executing on a computing device; and
analyzing, by the at least one processor, the call graph to:
determine at least one dependency between the at least two different source code files that is indicated by at least one dependency between functions in the at least two different source code files; and
generate impact analysis information that describes, for a change to one of the functions, a minimal path that includes other functions that exhibit a dependency on the changed function.

2. The method of claim 1, wherein the code is front end code.

3. The method of claim 1, further comprising:
analyzing, by the at least one processor, the call graph to generate a resource optimization recommendation regarding a rearrangement of the functions among the at least two different source code files.

4. The method of claim 1, wherein the annotations include a respective annotation that is added to a first line of the respective function to indicate the entry into the respective function.

5. A system, comprising:
at least one processor; and
a memory communicatively coupled to the at least one processor, the memory storing instructions which, when executed by the at least one processor, cause the at least one processor to perform operations comprising:
instrumenting, by the at least one processor, code to add annotations to each of a plurality of functions in the code, wherein the annotations are added to functions that are described in at least two different source code files containing different code, wherein the annotations include a store annotation added before and a retrieve annotation added after each of the plurality of functions in the code, wherein executing the store annotation stores a current call stack before execution of a respective function, and wherein executing the retrieve annotation retrieves the current call stack after execution of the respective function;
executing, by the at least one processor, the code including the annotations to generate information that at least indicates for each of the functions:
an entry into the respective function that is indicated by execution of a respective annotation included in the respective function;
the current call stack before execution of the respective function; and
the current call stack after execution of the respective function;
analyzing the information to generate a call graph that indicates dependencies among the functions in the code;
providing the call graph for presentation in a user interface (UI) executing on a computing device; and
analyzing, by the at least one processor, the call graph to:
determine at least one dependency between the at least two different source code files that is indicated by at least one dependency between functions in the at least two different source code files; and
generate impact analysis information that describes, for a change to one of the functions, a minimal path that includes other functions that exhibit a dependency on the changed function.

6. The system of claim 5, wherein the code is front end code.

7. The system of claim 5, the operations further comprising:
analyzing the call graph to generate a resource optimization recommendation regarding a rearrangement of the functions among the at least two different source code files.

8. The system of claim 5, wherein the annotations include a respective annotation that is added to a first line of the respective function to indicate the entry into the respective function.

9. One or more non-transitory computer-readable storage media storing instructions which, when executed by at least one processor, cause the at least one processor to perform operations comprising:
instrumenting, by the at least one processor, code to add annotations to each of a plurality of functions in the code, wherein the annotations are added to functions that are described in at least two different source code files containing different code, wherein the annotations include a store annotation added before and a retrieve annotation added after each of the plurality of functions in the code, wherein executing the store annotation stores a current call stack before execution of a respective function, and wherein executing the retrieve annotation retrieves the current call stack after execution of the respective function;
executing, by the at least one processor, the code including the annotations to generate information that at least indicates for each of the functions:
an entry into the respective function that is indicated by execution of a respective annotation included in the respective function;
the current call stack before execution of the respective function; and
the current call stack after execution of the respective function;
analyzing the information to generate a call graph that indicates dependencies among the functions in the code;
providing the call graph for presentation in a user interface (UI) executing on a computing device; and
analyzing, by the at least one processor, the call graph to:
determine at least one dependency between the at least two different source code files that is indicated by at least one dependency between functions in the at least two different source code files; and generate impact analysis information that describes, for a change to one of the functions, a minimal path that includes other functions that exhibit a dependency on the changed function.

11. The one or more non-transitory computer-readable storage media of claim 9, the operations further comprising:
analyzing the call graph to determine at least one dependency between the at least two different source code files that is indicated by at least one dependency between functions in the at least two different source code files.

11. The one or more non-transitory computer-readable storage media of claim 9, wherein the annotations include a respective annotation that is added to a first line of the respective function to indicate the entry into the respective function.

\* \* \* \* \*